United States Patent [19]

Lacombat et al.

[11] 4,373,814

[45] Feb. 15, 1983

[54] COMPACT OPTICAL COUPLING DEVICE AND OPTICAL-FIBER INTERFEROMETER GYROMETER COMPRISING SUCH A DEVICE

[75] Inventors: Michel Lacombat; Georges Pircher, both of Paris, France; Hervé LeFevre, Stanford, Calif.

[73] Assignee: Thomson-CSF, Paris, France

[21] Appl. No.: 146,159

[22] Filed: May 2, 1980

[30] Foreign Application Priority Data

May 2, 1979 [FR] France ................................ 79 11020

[51] Int. Cl.³ .......................... G01C 19/64; G02B 7/26
[52] U.S. Cl. .................................. 356/350; 350/96.15; 350/96.18; 356/73.1
[58] Field of Search .......................... 356/73.1, 350; 350/96.15, 96.18, 96.19

[56] References Cited

U.S. PATENT DOCUMENTS 4,130,345 12/1978 Doellner ...................... 350/96.15 X
4,299,490 11/1981 Cahill et al. .......................... 356/350

FOREIGN PATENT DOCUMENTS 2344855 10/1977 France .

OTHER PUBLICATIONS

"Data Highway Using Optical Fiber Cable", Ueno et al., Conference on Laser & Electro Optical System, May 1976, pp. 78-79.

*Primary Examiner*—Vincent P. McGraw
*Attorney, Agent, or Firm*—Oblon, Fisher, Spivak, McClelland & Maier

[57] ABSTRACT

A compact optical coupling device particularly adapted for coupling between a source and two optical fiber ends having a function of separation of the radiation from the source between these two ends. The device comprises a small-size separator cube, a plano-convex microlens whose flat face is bonded to the input face of the separator cube, and two square-section end-pieces bonded to the two output faces of the separator cube, each enclosing one fiber end.

5 Claims, 3 Drawing Figures

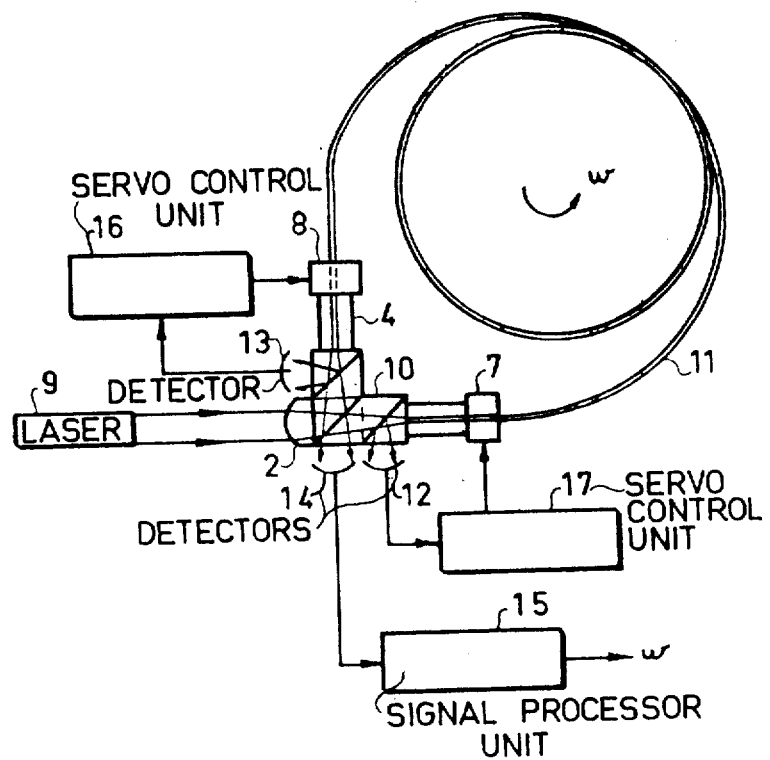

COMPACT OPTICAL COUPLING DEVICE AND OPTICAL-FIBER INTERFEROMETER GYROMETER COMPRISING SUCH A DEVICE

BACKGROUND OF THE INVENTION

The invention relates to the field of optical measurements and connections and relates more particularly to a compact optical coupling device providing a rigid mechanical connection between a radiation separating element and ends of optical fibers.

When an optical device formed by discrete elements receives the radiation from a laser source and must transmit it, after separation, to optical fibers, monomode for example, it is absolutely necessary to carry out very accurate adjustments, so that the coupling losses are as small as possible during coupling of the radiation into the fiber or fibers where it is to be transmitted. In particular, the radiation from the source must be focused, and the ends of the fibers must be very accurately positioned so that the plane of the end passes through the focusing point. Thus, the coupling losses are minimized.

This is in particular the case for an optical-fiber gyrometer in which the radiation from the laser source is transmitted after separation into two equal parts to the two ends of the same coiled-up optical fiber. For the coupling losses to be minimum, the separating element and the ends of the fiber must be very accurately located in relation to each other. Moreover, the positioning must be fixed so that the signal received after recombination of the waves emerging from the fiber after having traveled in opposite directions is stable in time when the rotational speed of the gyrometer is constant.

The invention proposes a compact optical coupling device which avoids the drawbacks of the coupling devices formed from separate elements and which requires then no adjustment. Such a device has the advantage of stability, the positioning of its components in relation to each other being permanently provided and incapable of being modified.

SUMMARY OF THE INVENTION

The invention provides then a compact optical coupling device comprising an optical separation or optical radiation recombination element comprising at least one separation or recombination plane and two flat faces symmetrical in relation to said plane, and two end-pieces each having one endmost flat face and a central channel orthogonal to this said flat face, one fiber end rigidly held in each of said end-pieces being flush with said flat face, and means for fixing said end-pieces to said faces of said optical separation element symmetrical with respect to said separation or recombination plane.

The above and other objects, features and advantages of the present invention will become apparent from the following description, given solely by way of non-limiting illustration, when taken in conjunction with the accompanying drawings.

DESCRIPTION OF THE DRAWINGS

FIG. 3 shows an interferometer gyrometer with optical fiber comprising such a coupling device.

DESCRIPTION OF THE PREFERRED EMBODIMENTS

Figure 1:
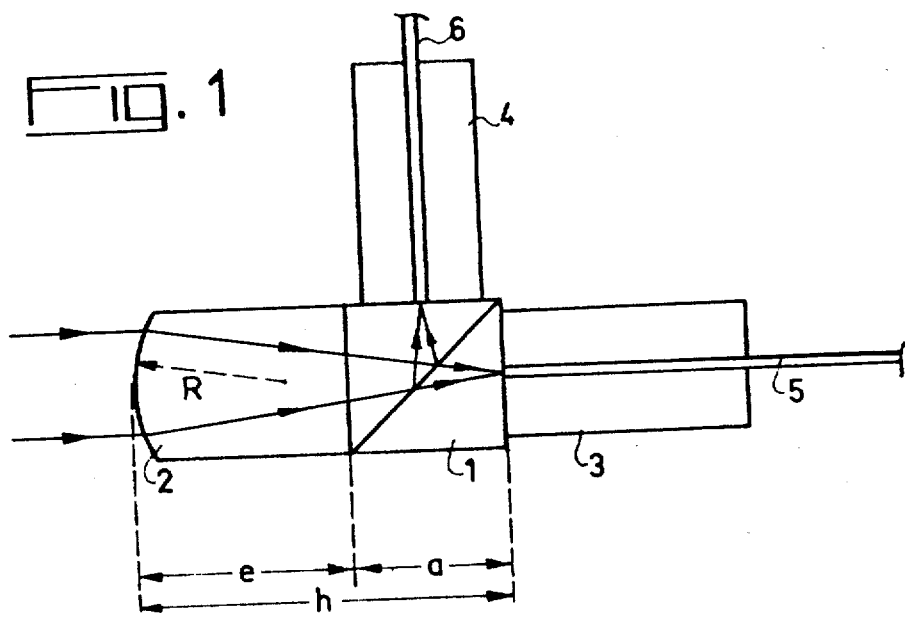
FIG. 1 shows a first embodiment of the compact optical coupling device of the invention.

The embodiment of the compact optical coupling device shown in FIG. 1 comprises a small-size separator cube 1 made from silica and having typically an edge of 5 mm, the faces of which are very flat. The flatness of these faces may be of the order of ($\lambda/8$), $\lambda$ being the wavelength of the radiation from a monochromatic source which this separating element is to transmit. A plano-convex microlens 2, of diameter D, D being equal to the edge of the separating cube, having a radius of curvature R and a thickness e, also made from silica, is bonded to one of the input faces of the separator cube. The radius of curvature R and the thickness e of the plano-convex microlens are such that a collimated radiation having an axis orthogonal to the flat face, incident on the spherical face, is focused on the output faces of the separator cube. For example if $a=5$ mm and $e=7$ mm, the length h of the light path in the silica is equal to 12 mm and the corresponding radius of curvature R is 4 mm. Two square-section silica end-pieces 3 and 4, each enclosing an optical fiber end, respectively 5 and 6, are bonded to the output faces of the separator cube, after the ends of the fibers have been suitably positioned. For that, the end of the fiber is enclosed in a channel formed in the end-piece and centered with respect to this end-piece, and is polished until it is flush with the end of the end-piece. Then, the end-piece with the fiber is placed against the corresponding output face of the separator cube, and its position in this output face is adjusted by means of micrometric translation movements so that a parallel radiation having the same axis as the lens is focused on the end of the fiber and that conversely, the central direction of radiation emerging from the fiber is perpendicular to the flat face of the end of the end-piece, and so to the corresponding face of the separator cube. When the end-piece is suitably positioned with respect to the separator cube and to the microlens, a photo-polymerizable adhesive, for example, deposited between the output face of the separator cube and the end of the end-piece is subjected to radiation which allows rapid setting.

When the two end-pieces enclose the ends of the same optical fiber, the optical fiber has passing therethrough simultaneously in both directions two fractions of the radiation, and the radiations emerging from both ends of the fiber are recombined by the separator cube which then acts on the outward path of the radiation as a separation element and on the inward path of the radiation as a recombination element. Such a device is particularly useful for a coiled optical-fiber interferometer gyrometer.

Figure 2:
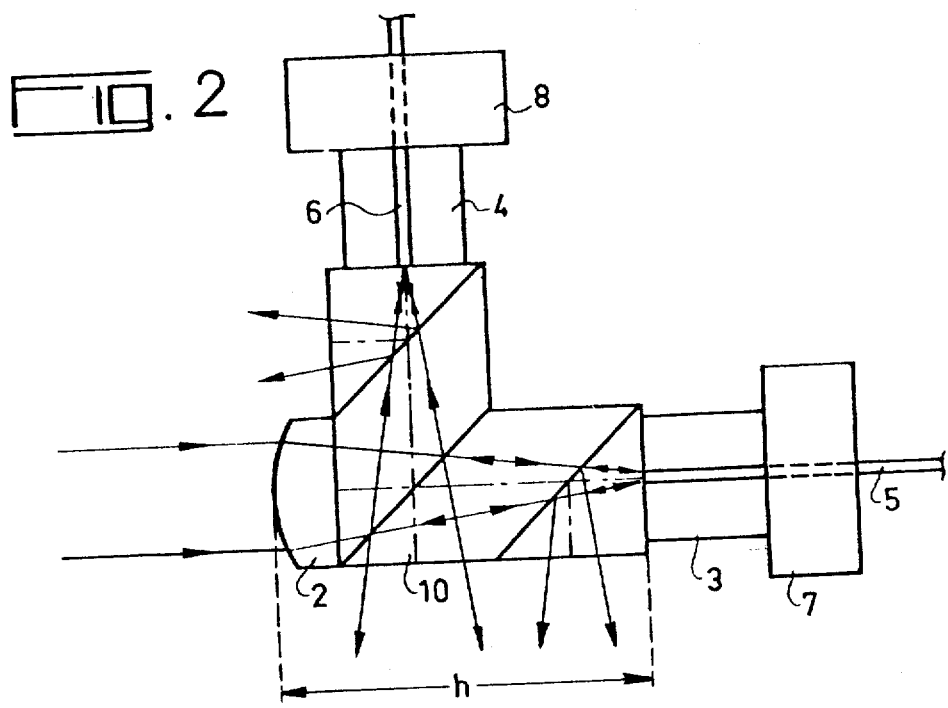
FIG. 2 shows a second embodiment of a compact optical coupling device in accordance with the invention.

FIG. 2 shows a second embodiment of the compact optical coupling device of the invention. In this figure, the separator cube 1 of FIG. 1 is replaced by a complex element for separating and recombining the radiation 10. This element is in fact formed from three separator cubes joined side by side and is intended to effect several successive separations of the radiation, or else to separate the return radiation emerging from the fiber after circulation, for example in the application to the interferometer gyrometer, in which it is desired to take off a fraction of the return radiation emerging from each end of the fiber before recombination. This optical element 10 may be formed from several separator cubes bonded to one another, the input face of one cube being bonded to the output face of the preceding cube, or may be cut from a single mass. In this second embodiment, since the optical path in the optical separation element is longer, the thickness of the lens is reduced so that the incident radiation is always focused at the fiber ends enclosed in the end-pieces 3 and 4.

The radius of curvature of the convex face and the distance h which is associated therewith are chosen with respect to the collimated beam so that the light cone in the silica corresponds to the numerical aperture of the fiber, in the silica.

Furthermore, it is possible to provide after end-pieces 3 and 4, active elements 7 and 8 acting on the fiber so as to introduce the polarization rotations which would be required to improve the operating conditions in a utilization optical circuit, for example for adjusting the polarization of the incident radiation in the fiber along a direction particularly adapted to obtain good propagation conditions.

FIG. 3 shows an optical-fiber interferometer gyrometer using the compact coupling device shown in FIG. 2. The device comprises a laser source 9 suitably positioned with respect to the coupling device formed from lens 2 and the assembly 10 constituted by three separator cubes, so that the optical axis of the laser radiation emerging from source 9 is orthogonal to an output face of this coupling device. End-pieces 3 and 4 enclose the ends 5 and 6 of a coiled monomode optical fiber 11. Thus, the radiation from laser source 9 is divided by the separator cube bonded to lens 2 into two equal fractions directed towards the ends of the fiber. The radiation therefore travels simultaneously through the coiled optical fiber in both directions and the two waves emerging from the ends of the fiber are recombined by this same separator cube. Previously on the return path of the radiation, the two complementary separator cubes bonded to the output face of the first one, separate the radiation emerging from each fiber end so that detectors 12 and 13, picking up non-recombined fractions of the emerging radiation, deliver signals characteristic of the amplitude of the waves emerging from the fiber. The recombined parts of the radiation emerging from the ends of this fiber are directed towards a detector 14 supplying the interference signal between the two waves emerging from this fiber, this interference signal being directly tied to the phase shift between the two emerging waves, the phase shift being itself directly proportional to the rotational speed of the assembly about the axis of the fiber coil. A processing circuit 15 provides a signal proportional to the rotational speed w of the gyrometer. Detectors 12 and 13 supply signals processed by servocontrol circuits 16 and 17 acting on the propagation conditions in the fiber so as to maintain at all times the signals emerging at maximum intensity. The compact coupling device of the invention avoids vibrations induced in the structure and so variations in intensity of the signals received induced by these vibrations.

The invention is not limited to the embodiments described with reference to FIGS. 1 and 2, nor to the application described with reference to FIG. 3 for an optical-fiber interferometer gyrometer. This compact coupling technique may be used to avoid adjustment of the positioning of the fiber with respect to elements for separating or recombining the radiation. This technique may also be used in an optical fiber hydrophone comprising an optical fiber forming a measuring arm and an optical fiber forming a reference arm. Such a device requires then the use of two compact coupling devices, one comprising a flat microlens bonded to an input face of a separator cube, two end-pieces being bonded to the output faces of this separator cube, these end-pieces enclosing the first ends of an optical fiber forming a measuring arm and an optical fiber forming a reference arm. The second ends of these two fibers are enclosed in two similar end-pieces bonded to two faces of a separator cube for recombining the radiation emerging from these two fibers. Such a hydrophone, because of the above-described compact optical coupling devices, would get rid of the vibrations tied to the structure, the ends of the optical fibers being at all times suitably positioned with respect to the optical elements for separating or recombining the radiation.

The dimensions of the compact coupling device are such that this device may be directly associated with a laser source supplying a collimated radiation without it being necessary to introduce into the radiation path a beam-widener.

It is apparent that within the scope of the invention, modifications and different arrangements can be made other than are here disclosed. The present disclosure is merely illustrative with the invention comprehending all variations thereof.

What is claimed is:

1. A compact optical coupling device for coupling radiation from a source to two fiber ends, comprising:
    an optical element for optical radiation separation or recombination having at least one separation or recombination plane and two flat faces symmetrical with respect to said plane,
    two end-pieces each having an endmost flat face and a central channel bonded to said element orthogonal to said flat faces,
    a fiber end rigidly held in each of said end-pieces being flush with said flat face,
    said end-pieces bonded to said faces of said optical separation element symmetrical with respect to said separation or recombination plane,
    a plano-convex lens whose flat face is bonded to one of said flat faces called input face of the optical element and whose convex input face is such that the radiation having an axis orthogonal to said flat face is focused on said fiber ends.

2. The device as claimed in claim 1, wherein said optical separation or recombination element is a separator cube.

3. The device as claimed in claim 1, wherein said optical separation or recombination element comprises several separation or recombination planes.

4. The device as claimed in claim 1 for recombining the radiation emerging from said two fiber ends, comprising furthermore detection means fixed to at least one of said flat faces called output face of the optical element.

5. An optical-fiber interferometer gyrometer comprising a compact coupling device as claimed in claim 1 in which said two fiber ends are the ends of the same monomode optical fiber coiled on itself, said optical element being intended for coupling the radiation from a laser source to both ends of said fiber on the one hand, and for recombining the radiation emerging from its two fiber ends after traveling in said fiber in opposite directions on the other hand.

* * * * *